US00RE40098E

(19) United States
(12) Reissued Patent
Jeon et al.

(10) Patent Number: US RE40,098 E
(45) Date of Reissued Patent: Feb. 26, 2008

(54) FOOD DEBRIS FILTERING APPARATUS FOR DISHWASHER AND METHOD THEREOF

(75) Inventors: Simon Jeon, Seoul (KR); Joon W. Kim, Kwangmyung-si (KR)

(73) Assignee: LG Electronics, Inc., Seoul (KR)

(21) Appl. No.: 11/178,264

(22) Filed: Jul. 11, 2005

Related U.S. Patent Documents

Reissue of:
(64) Patent No.: 5,601,660
Issued: Feb. 11, 1997
Appl. No.: 08/584,893
Filed: Jan. 11, 1996

(30) Foreign Application Priority Data

Sep. 19, 1995 (KR) ..... 30720/1995

(51) Int. Cl.
*B08B 3/02* (2006.01)

(52) U.S. Cl. ..... 134/10; 134/104.1; 134/104.4; 134/111; 210/409

(58) Field of Classification Search ..... 134/10, 134/57 D, 58 D, 104.1, 104.4, 111; 210/407, 210/408, 409
See application file for complete search history.

(56) References Cited

U.S. PATENT DOCUMENTS

| | | | | |
|---|---|---|---|---|
| 2,681,658 A | * | 6/1954 | Meeker et al. | 134/111 |
| 2,862,510 A | * | 12/1958 | Geiger et al. | 134/111 |
| 3,129,711 A | * | 4/1964 | Schmitt-Matzen | 134/56 D |

(Continued)

FOREIGN PATENT DOCUMENTS

| | | | |
|---|---|---|---|
| DE | 2 737 440 | * | 2/1979 |
| DE | 8913614 | | 3/1990 |
| DE | 3842640 | | 6/1990 |
| DE | 4412903 | | 11/1994 |
| DE | 9415486 | | 1/1995 |
| EP | 0 15 478 | * | 12/1984 |
| GB | 2 191 082 | * | 12/1987 |
| GB | 2 204 482 | * | 11/1988 |
| JP | 56-027235 | | 3/1981 |
| JP | 61-170430 | | 8/1986 |
| JP | 63-183034 | | 7/1988 |
| JP | 64-046430 | | 2/1989 |
| JP | 2-128737 | * | 5/1990 |
| JP | 4-193248 | * | 7/1992 |
| JP | 4-319328 | * | 11/1992 |

OTHER PUBLICATIONS

English Language Abstract of DE 38 42 640.
English Language Abstract of JP 64–046430.

*Primary Examiner*—Frankie L. Stinson
(74) *Attorney, Agent, or Firm*—Greenblum & Bernstein, P.L.C.

(57) ABSTRACT

An improved food debris filtering apparatus for a dishwasher and a method thereof capable of more effectively discharging food debris by separating the same from washing water and resupplying the filtered washing water so as to wash dishes, so that dish washing efficiency is increased, which includes a filtering apparatus for filtering washing water polluted during a dish washing operation; a washing water circulation unit for supplying the washing water filtered by the filtering apparatus to a spray arm; a washing water discharging unit, such as a discharging pump, for discharging pan of washing water lo containing food debris to the outside of the system; a flowing path opening/closing unit disposed at a washing water discharging path for selectively opening/closing the washing water discharging path in cooperation with the washing water circulation unit or the washing water discharging unit; and a food debris gathering and storing unit disposed between the washing water circulation unit and the washing water discharging path for filtering washing water filtered by the filtering apparatus and for gathering and storing the food debris contained in the washing water.

18 Claims, 7 Drawing Sheets

U.S. PATENT DOCUMENTS 3,217,884 A * 11/1965 Long ..... 210/108
3,491,780 A * 1/1970 Kaldenberg ..... 134/104.1
3,807,419 A * 4/1974 Cushing et al. ..... 134/104.1
3,810,480 A * 5/1974 Smith et al. ..... 134/104.1
3,989,054 A * 11/1976 Mercer ..... 134/104.1
4,243,431 A * 1/1981 Dingler et al. ..... 134/104.1
4,319,599 A * 3/1982 Dingler et al. ..... 134/104.4
4,559,959 A * 12/1985 Meyers ..... 134/56 D
4,972,861 A * 11/1990 Milocco et al. ..... 134/104.1
5,333,631 A * 8/1994 Kirkland et al. ..... 134/104.1

* cited by examiner

AMENDED

AMENDED

FOOD DEBRIS FILTERING APPARATUS FOR DISHWASHER AND METHOD THEREOF

Matter enclosed in heavy brackets [ ] appears in the original patent but forms no part of this reissue specification; matter printed in italics indicates the additions made by reissue.

*The present application is a reissue of U.S. patent application Ser. No. 08/584,893 filed on Jan. 11, 1996 which issued as U.S. Pat. No. 5,601,660 on Feb. 11, 1997.*

BACKGROUND OF THE INVENTION

1. Field of the Invention

The present invention relates to a food debris filtering apparatus for a dishwasher and a method thereof, and particularly to an improved food debris filtering apparatus for a dishwasher and a method thereof capable of more effectively discharging food debris by separating the same from washing water and resupplying the filtered washing water so as to wash dishes, so that [dishes washing] *a dishwashing* efficiency is increased.

2. Description of the Conventional Art

FIG. 1 shows a conventional dishwasher, which includes a washing chamber 2 formed inside a body 1, and a door 3 attached to the front portion of the body 1.

A dish rack 4, on which dishes (not shown) are placed, is disposed at the inner upper portion of the washing chamber 2, and a spray arm 5 having a plurality of washing water spray openings 5a formed on the upper surface of the same is disposed at the central portion of the washing chamber 2, and a heater 6 is disposed at the bottom of the washing chamber 2.

Washing water is sprayed toward dishes from the washing water spray openings 5a [in a state that] *when* the dishes are placed on the dish rack 4 of the washing chamber 2, thus washing the dishes. Here, the heater 6 is directed to heating the interior of the washing chamber 2 so that dishes can be easily washed.

Meanwhile, the conventional dishwasher further includes a filtering apparatus F for filtering washing water, which is polluted through *a* dish washing operation, a washing water circulation unit such as a washing pump for supplying the washing water filtered by the filtering apparatus F to the spray arm 5, and a washing water discharging unit such as a discharging pump for discharging part of the washing water from the filtering apparatus F to the outside of the [system] *dishwasher*.

As shown in FIG. 2, a washing water (containing food debris) gathering tub 7 having a predetermined depth is disposed below the washing chamber 2, *and* first, second, and third filters 8, 9, and 10 of the filter apparatus F are disposed at the washing water gathering tub 7. A circulation tube 11 is connected between a predetermined portion of the side wall of the washing water gathering tub 7 and the spray arm 5. A washing water discharging tube 12 is connected to the bottom of the washing water gathering tub 7, and a washing water circulation unit P1 such as a filtering unit and a washing water discharging unit P2 such as a discharging pump [which] are disposed at the circulation tube 11 and the discharging tube 12, respectively.

The first filter 8 is formed with a net having a plurality of net eyes having a certain size capable of filtering relatively [big size] *large* food particles, and the second filter 9 is formed with a net having a plurality of net eyes having a certain size capable of filtering intermediate size food particles, and the third filter 10 is formed with a net having a plurality of net eyes having a certain size capable of *filtering* small food particles.

The second filter 9 is engaged to the washing water gathering tub 7, [and] the first filter 8 is engaged to the intermediate portion of the second filter 9, and the third filter 10 surrounds the first filter 8 and is connected to the discharging tube 12.

The conventional dishwasher including the filtering apparatus F, the washing water circulation unit P1, and the washing water discharging unit P2 is directed to filtering washing water by permitting the washing water to flow *through* the first, second, and third filters 8, 9, and 10 through the bottom of the washing chamber 2. The filtered washing water is supplied to the spray arm 5 in cooperation with the washing water circulation unit P1, and the washing water is sprayed from the washing water spraying openings 5a of the spray arm 5, so that *a* dish washing operation is performed through the above-mentioned procedures.

Meanwhile, food particles clogged at the net eyes of the third filter 10 are discharged to the outside of the [system] *dishwasher* through the discharging tube 12 in cooperation with the washing water discharging unit P2.

However, the conventional dishwasher has disadvantages in that relatively small food particles are not effectively filtered by the filtering apparatus F, and the recirculated washing water is not clean enough to wash dishes. In addition, washing water should be resupplied from the outside of the [system] *dishwasher*, so as to reduce *the* pollution level of the washing water. [moreover] *Moreover*, a lot of washing water is required for *a* long time, so that *a* washing efficiency is decreased.

SUMMARY OF THE INVENTION

Accordingly, it is an object of the present invention to provide a food debris filtering apparatus for a dishwasher and a method thereof, which overcome the problems encountered in a conventional food debris filtering apparatus for a dishwasher and a method thereof.

It is another object of the present invention to provide an improved food debris filtering apparatus for a dishwasher and a method thereof capable of more effectively discharging food debris by separating the same from washing water and resupplying the filtered washing water so as to wash dishes, so that dish washing efficiency is increased.

To achieve the above objects, [them] *there* is provided a food debris filtering apparatus, which includes a filtering apparatus for filtering washing water polluted during a dish washing operation; a washing water circulation unit for supplying the washing water filtered by the filtering apparatus to a spray arm; a washing water discharging unit, such as a discharging pump, for discharging part of washing water containing food debris particles to the outside of the [system] *dishwasher*; a flowing path opening/closing unit disposed at a washing water discharging path for selectively opening/closing the washing water discharging path in cooperation with the washing water circulation unit or the washing water discharging unit; and a food debris gathering and storing unit disposed between the washing water circulation unit and the washing water discharging path for filtering washing water filtered by the filtering apparatus and for gathering and storing the food debris particles contained in the washing water.

To achieve the above objects, [them] *there* is provided a food debris filtering method for a dishwasher, which includes the steps of a discharging path blocking step which stops a driving of a washing water discharging unit in a dish washing mode and blocks a washing water discharging path in cooperation with a washing water circulation unit; a washing water circulation and refiltering step which sprays a part of washing water filtered by a filtering apparatus in cooperation with a driving of the washing water circulation unit and supplies the remaining part thereof to an assistant filter; a food debris gathering and storing step which gathers food debris filtered by the assistant filter and stores the thusly filtered food debris in a certain box; a washing water discharging flowing path opening step which stops a driving of the washing water circulation unit and opens a washing water flowing path by driving the washing water discharging unit in a discharging mode; and a food debris discharging step which discharges food debris to the outside of the [system] *dishwasher* together with washing water in cooperation with a driving of the washing water discharging unit.

DETAILED DESCRIPTION OF THE INVENTION

Figure 1:
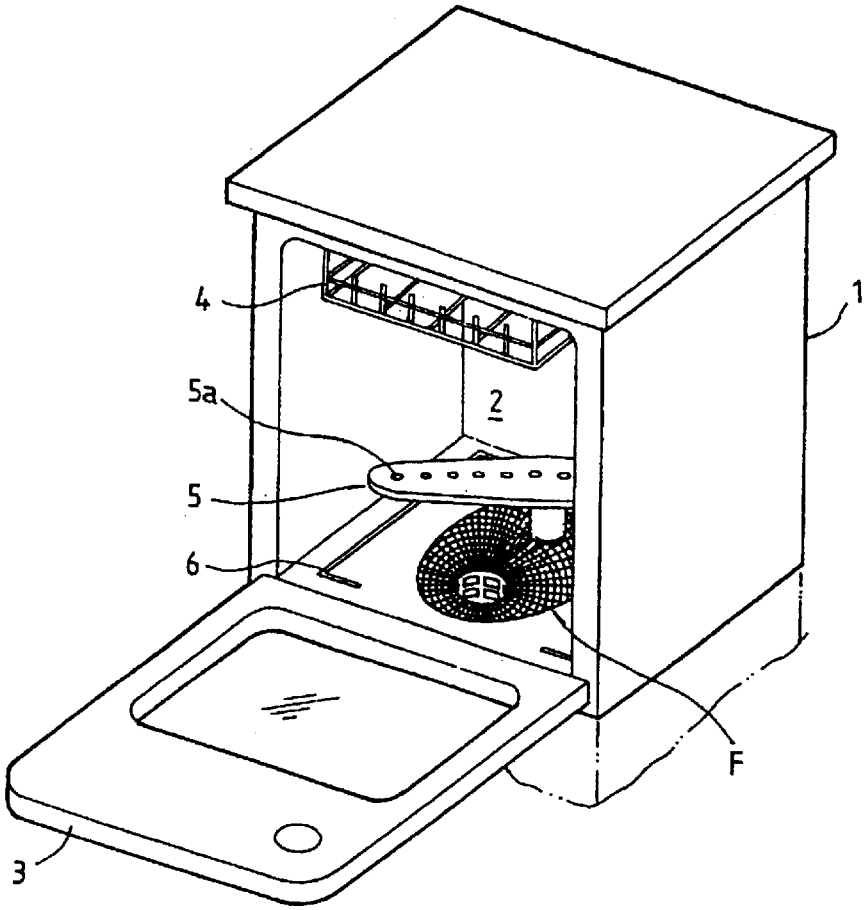
FIG. 1 CONVENTIONAL ART
FIG. 1 is a perspective view showing a conventional dishwasher.
Figure 2:
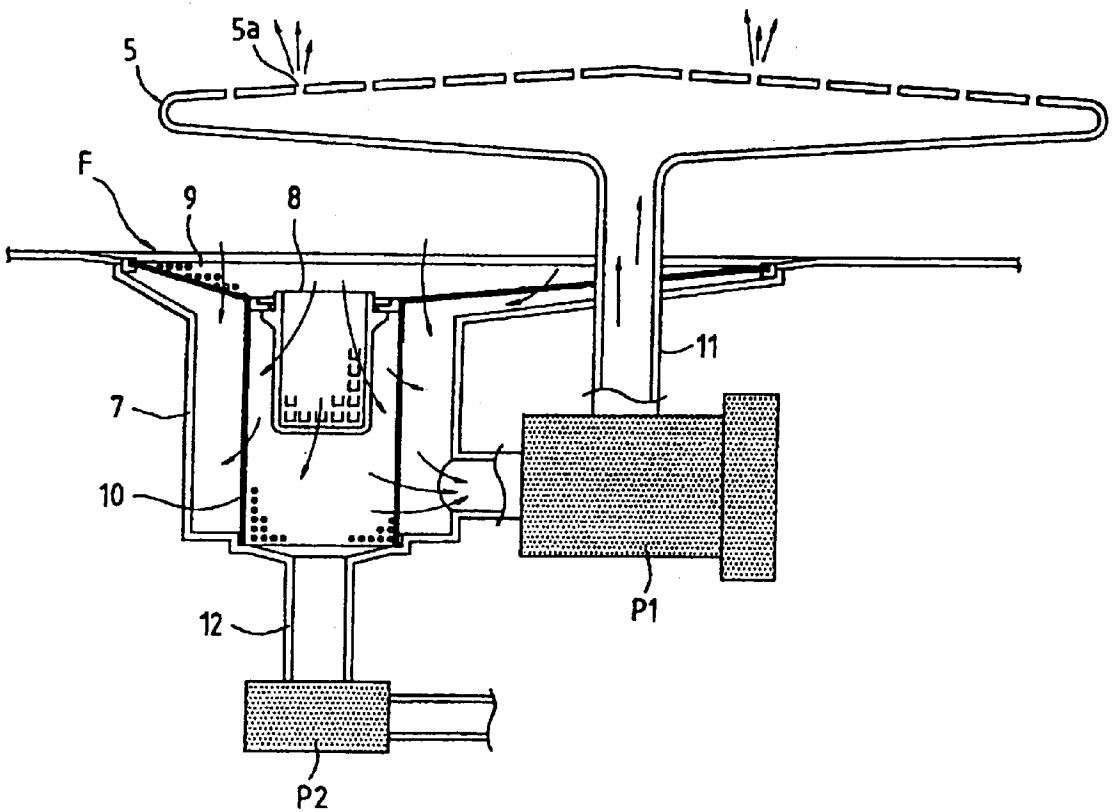
FIG. 2 CONVENTIONAL ART
FIG. 2 is a cross-sectional view of FIG. 1.
Figure 3:
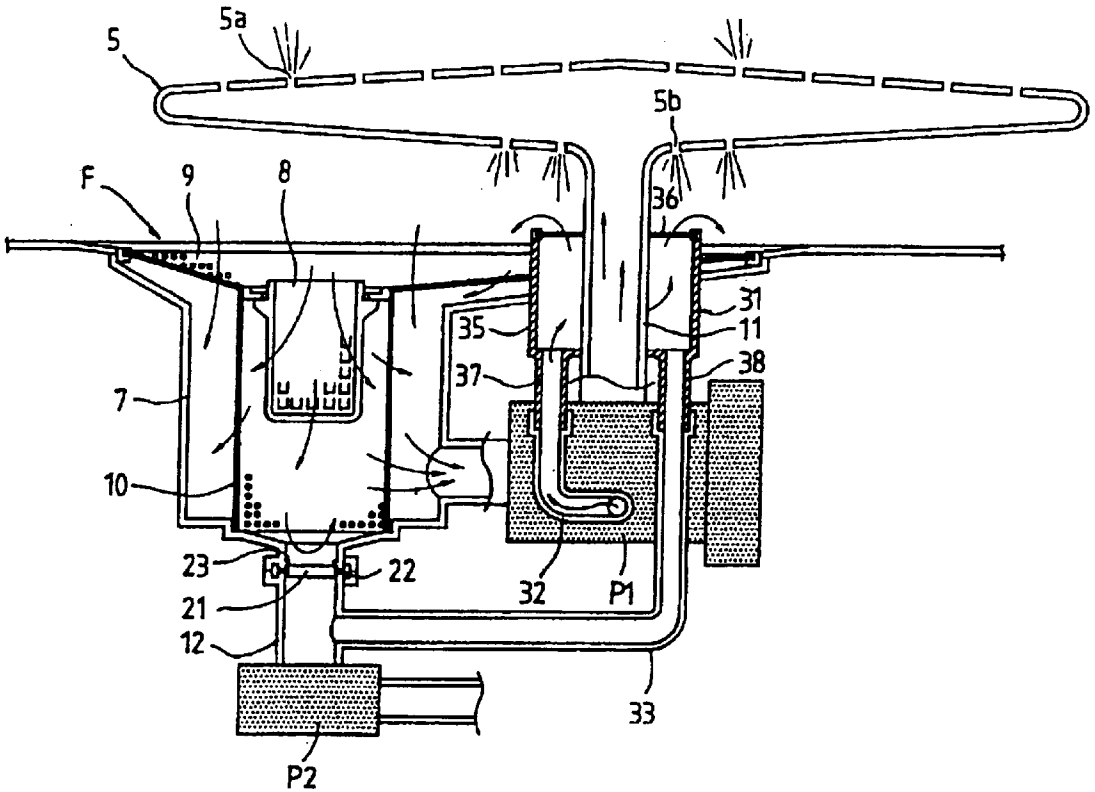
FIG. 3 is a cross-sectional view showing a food debris filtering apparatus for a dishwasher in a dish washing mode of a first embodiment according to the present invention.
Figure 4:
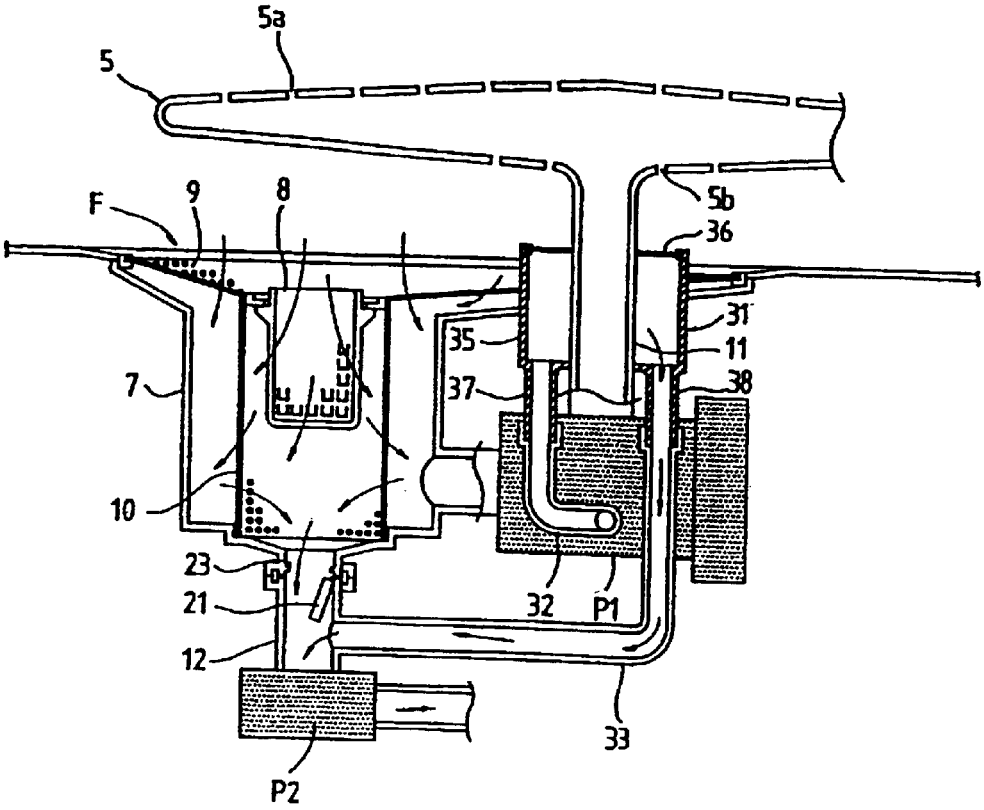
FIG. 4 is a cross-sectional view showing a food debris filtering apparatus for a dishwasher in a washing water discharging mode of a first embodiment according to the present invention.
Figure 5:
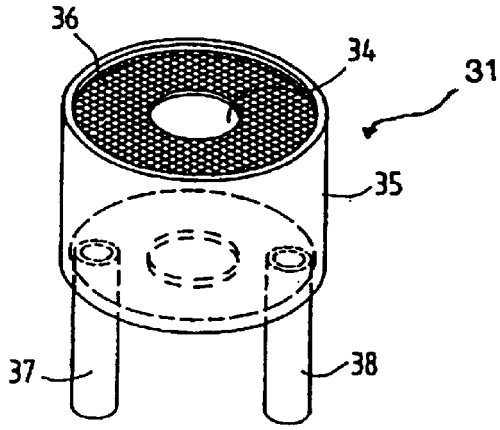
FIG. 5 is a perspective view showing a food debris gathering box of a food debris filtering apparatus for a dishwasher according to the present invention.

FIGS. 3 and 4 show a food debris filtering apparatus, and FIG. 5 shows an assistant filter of a first embodiment according to the present invention, which includes a filtering apparatus F for filtering washing water, which is polluted during dish washing operation, for reuse, a washing water circulation unit P1 such as a washing pump for supplying washing water filtered by the filtering apparatus F to a spray arm 5, a washing water discharging unit P2 for discharging part of washing water and filtered food particles to the outside of the [system] *dishwasher*, a washing water flowing path blocking unit disposed at a predetermined portion of the washing water discharging path for selectively blocking a washing water discharging path in cooperation with the washing water circulation unit P1 and the washing water discharging unit P2, and a food debris gathering and storing unit disposed between the washing water circulation unit P1 and the washing water discharging path for filtering washing water passed through the filtering apparatus F, for filtering debris and food particles contained in washing water, and storing the thusly filtered food debris.

The washing water discharging unit P2 *is disposed at the exit of a discharging tube 12, and* disposed at the entrance of the discharging tube 12 is a plate-shaped opening/closing valve 21.

The opening/closing valve 21 includes a hinge portion 22 formed on a periphery thereof and connected to the inner wall of the discharging tube 12, the opening/closing valve 21 being movable upwardly and downwardly about the hinge portion [2] *22*. An engaging portion 23 is formed on the inner surface of the discharging tube 12 for preventing the opening/closing value 21 from moving upwardly and for blocking the discharging tube 12.

Meanwhile, the food debris gathering and storing unit includes an assistant filtering unit 31 engaged to the circulation tube 11 of the spray arm 5 for gathering food particles contained in washing water, a washing water induction tube 32 for connecting the assistant filtering unit 31 and the washing water circulation unit P1, and a food debris induction tube 33 for connecting the assistant filtering unit 31 and the discharging [unit] *tube* 12 and for storing gathered food particles (food debris).

As shown in FIG. 5, the assistant filtering unit 31 includes a food debris gathering box 35 having an opening 34 formed therewithin, through which the circulation tube 11 of the spray arm 5 passes, a fourth filter 36 disposed at the upper portion of the food debris gathering box 35 and formed with a net having a plurality of small net eyes (*holes*) capable of filtering very small food particles, and connection tubes 37 and 38 disposed at both lower portions of the [foot] *food* debris gathering box 35 for connecting the washing water induction tube 32 and the food debris induction tube 33.

In addition, a plurality of downward spray openings 5b are formed on the lower surface of the spray arm 5, the downward spray openings 5b being [directed to get] *configured to remove* the food debris particles clogged at the fourth filter 36 [coming off therefrom in cooperation] with a high pressure water spray sprayed from the downward spray openings 5b.

In *the* drawings, the same reference numerals as the prior [an] *art* are given the same numbers in this embodiment of the present invention.

Next, the food debris filtering method for a dishwasher will now be explained.

Figure 8:
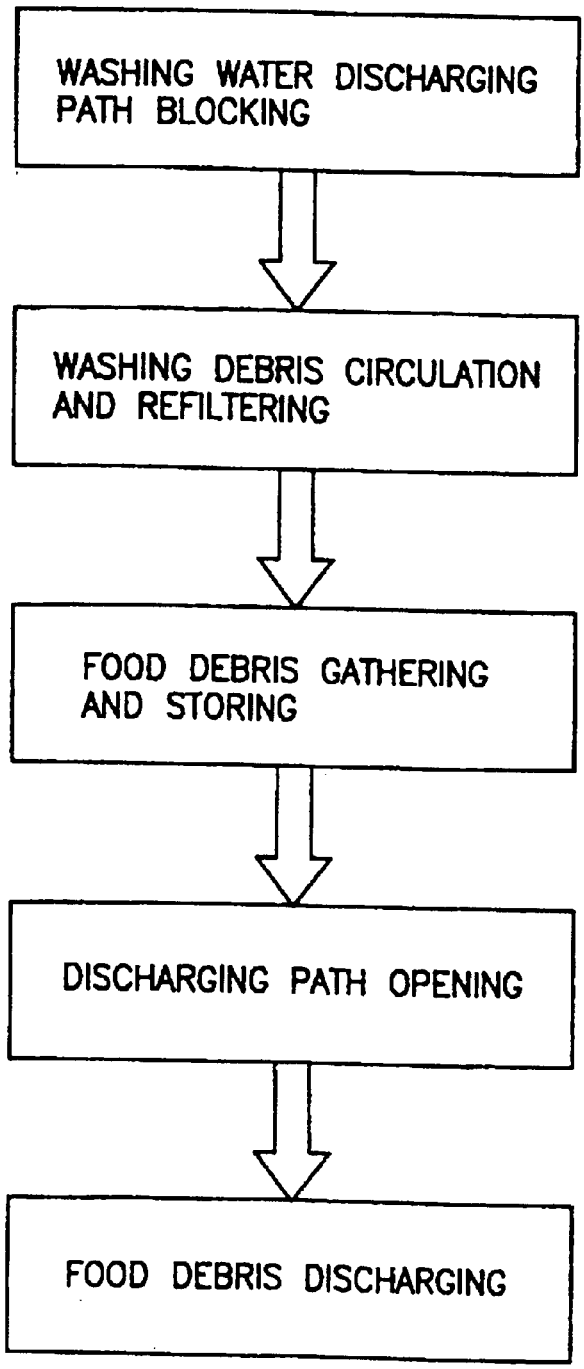
FIG. 8 is a flow chart of a food debris filtering method for a dishwasher according to the present invention.

FIG. 8 shows a flow chart for explaining the [foot] *food* debris filtering method, which includes the steps of a discharging path blocking step which stops a driving of a washing water discharging unit in a dish washing mode and blocks a washing water discharging path in cooperation with a washing water circulation unit; a washing water circulation and refiltering step which sprays a part of washing water filtered by a filtering apparatus in cooperation with a driving of the washing water circulation unit and supplies the remaining part thereof to an assistant filter; a food debris gathering and storing step which gathers food debris filtered by the assistant filter and stores the thusly filtered food debris in a certain box; a washing water discharging flowing path opening step which stops a driving of the washing water circulation unit and opens a washing water flowing path by driving the washing water discharging unit in a discharging mode; and a food debris discharging step which discharges food debris to the outside of the [system] *dishwasher* together with washing water in cooperation with a driving of the washing water discharging unit.

The food debris gathering and storing step is directed to downwardly spraying washing water from the spray arm *5* so as to [get] *remove* food debris [come] from the assistant filtering [apparatus in cooperation] *unit 31* with a high pressure washing water.

[The operation and effects of the food debris filtering apparatus for a dishwasher and a method thereof]

As shown in FIG. 3, in a dish washing mode, the operation of the washing water discharging unit P2 is stopped, and the washing water circulation unit P1 is driven, so that the interior pressure in the [food debris gathering box] *washing water gathering tub* 7 disposed below the washing chamber 2 is [increased] *decreased*, and the opening/closing valve 21 disposed at the entrance of the discharging tube 12 is lifted and closes the discharging tube 12.

At this time, the lifting of the opening/closing valve 21 is limited by the engaging section 23 formed at the inner wall of the discharging tube 12 and keeps a horizontal state inside the discharging tube 12, so that the discharging path of the discharging tube is effectively blocked.

In addition, a part of the washing water passed through the filtering apparatus F [consisted] *consisting* of the first, second, and third filters 8, 9 and 10 is supplied to the spray arm 5 through the circulation tube 11 in cooperation with the washing water circulation unit P1 and is sprayed toward the washing water spraying openings 5a of the spray arm 5, and the remaining part of the washing water passed therethrough flows into the food debris gathering box 35 of the assistant filtering unit 31 through the connection tube 37.

The washing water introduced into the food debris gathering box 35 is filtered again by the fourth filter 36 disposed at the entrance thereof, and the washing is effectively filtered again. The washing water filtered by the fourth filter 36 returns to the [food debris gathering box] *washing water gathering tub* 7 through the bottom surface of the washing chamber 2 and the filtering apparatus F, and the food debris filtered by the fourth filter 36 remains inside the food debris gathering box 35.

At this time, the food debris clogged [at] *in* the net [eyes] of the fourth filter 36 [come off therefrom in cooperation] *is removed* with a high pressure water downwardly sprayed from the lower surface [spraying opening] *spray openings* 5b.

The food debris gathered inside the food debris gathering box 35 move toward the food debris induction tube 33. As described above, the food debris which is not filtered by the filtering apparatus F is filtered [again] by the assistant filter 31 and stored inside the food debris gathering box 35 of the assistant filter 31 [and the induction tube 33], and the washing water filtered by the assistant filter 36 is recirculated and used as dish washing water again.

Meanwhile, in a discharging mode, the circulation unit P1 is stopped, and the washing water discharging unit P2 is driven, so that the pressure inside the discharging tube 12 is [increased] *decreased*. Therefore, the opening/closing valve 21 is lowered about the hinge section 22 so as to open the flowing path of the discharging tube 12. The washing water in the [food debris gathering box] *washing water gathering tub* 7 is discharged to the outside of the [system] *dishwasher* in cooperation with the washing water discharging unit [172] *P2*, and at the same time, the food debris gathered in the [food debris induction tube 33] *food debris gathering box 35* is discharged to the outside of the [system] *dishwasher* through the discharging tube 12 and the food debris induction tube 33 along with the washing water.

At this time, the food debris particles clogged [at] *in* the net [eyes] of the third filter 10 [come off therefrom] *are removed* by the washing water discharging unit P2 and are discharged to the outside of the [system] *dishwasher* through the discharging tube 12.

Figure 6:
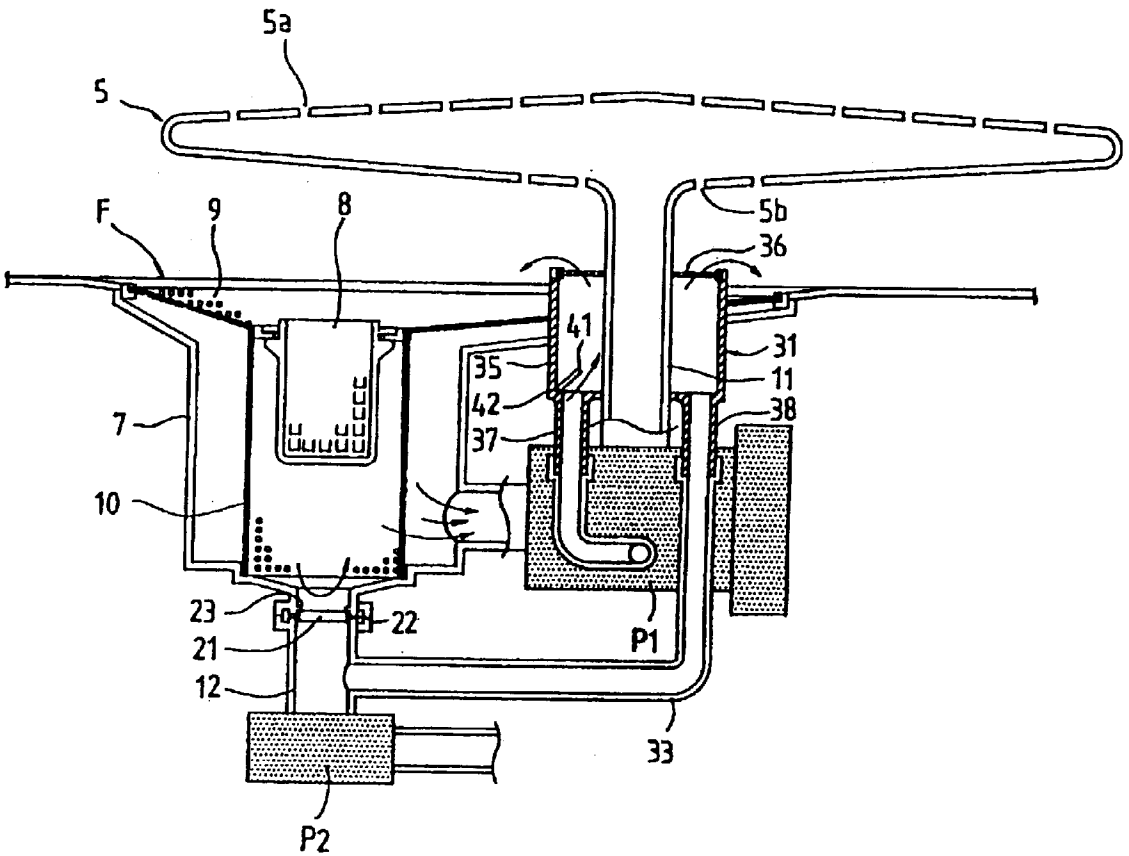
FIG. 6 is a cross-sectional view showing a food debris filtering apparatus for a dishwasher in a dish washing mode of a second embodiment according to the present invention.
Figure 7:
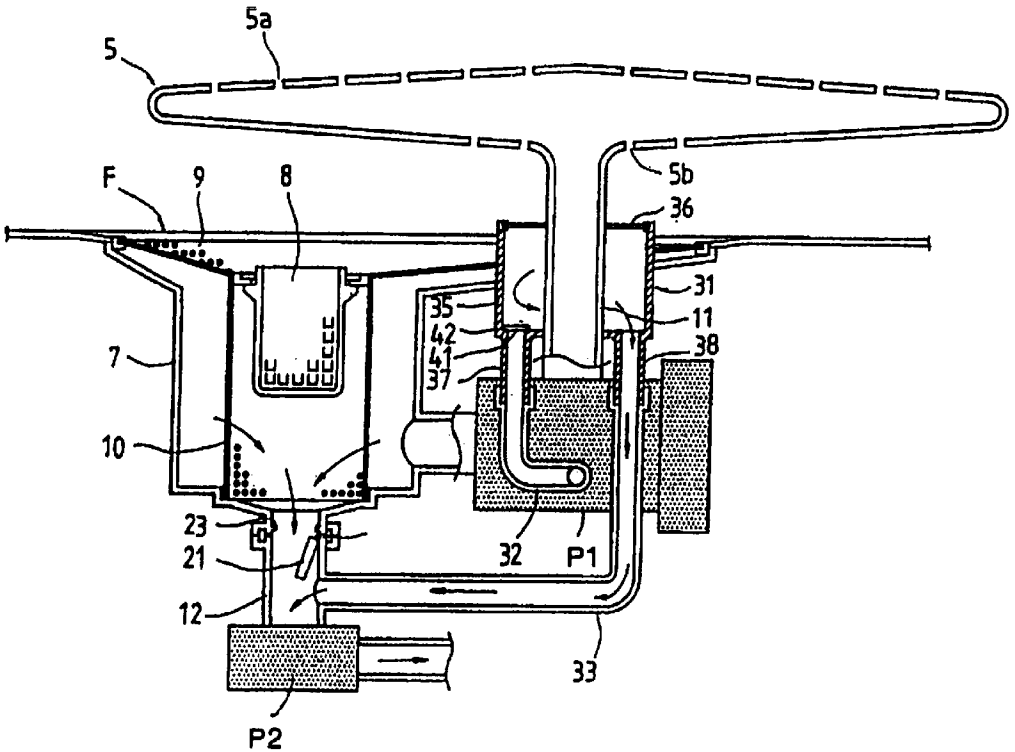
FIG. 7 is a cross-sectional view showing a food debris filtering apparatus for a dishwasher in a washing water discharging mode of a second embodiment according to the present invention.

Meanwhile, FIGS. 6 and 7 show a food debris filtering apparatus disposed at the assistant filter 31 of a second embodiment according to the present invention, which is directed to preventing washing water from reversely flowing toward the washing water circulation unit P1 in the discharging mode.

The washing water reverse flowing prevention unit is a plate-shaped opening/closing valve 41 disposed at the upper portion of the connection tube 37 connected to the washing water induction tube 32 of the food debris gathering box 35. The opening/closing valve 41 includes a hinge section 42, formed at a predetermined portion thereof and connected to the inner wall of the food debris gathering box 35, and is movable upwardly and downwardly about the hinge section 42.

The opening/closing valve *41* is preferably formed with a rubber material.

In this embodiment, since the opening/closing valve 41 is disposed at the upper portion of the connection tube 37 connected to the washing water induction tube 32 of the food debris gathering box 35, as shown in FIG. 6, in a dish washing mode, the washing water of the [food debris gathering box] *washing water gathering tub* 7 is [induced] *drawn* to the interior of the food debris gathering box 35 through the washing water induction tube 32 and the connection tube 37. At this time, [when] the washing water causes the opening/closing valve *41* to open in cooperation with the pressure thereof, and the washing water [in] *is* introduced into the food debris gathering box 35, and as shown in FIG. 7, in a discharging mode, since the washing water pressure at the side of the washing water circulation unit P1 is low, the opening/closing valve 41 is lowered about the hinge section 42 and blocks the flowing path of the connection tube 37. Therefore, the reverse flow of the [foot] *food* debris toward the washing water circulation unit P1 is effectively prevented.

Here, since the operation of the second embodiment is the same as the first embodiment, it is omitted.

As described above, the food debris filtering apparatus for a dishwasher and a method thereof according to the present invention is directed to more effectively filtering the washing water by providing an assistant filter at a circulation path of the washing water, thereby increasing washing efficiency, and in addition, the washing water filtered from food debris is resupplied to the [system] *dishwasher* for reuse, and the food debris filtered therefrom is gathered at a certain place and discharged to the outside of the [system] *dishwasher*, so that the dish washing efficiency is increased.

Moreover, the food debris clogged at the fourth filter is automatically [come off therefrom] *removed*, not by hands, so that it is more convenient compared with the conventional art.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A food debris filtering apparatus for a dishwasher, comprising:

a filtering apparatus for filtering washing water polluted during a dish washing operation;

washing water circulation means for supplying the washing water filtered by said filtering apparatus to a spray arm;

washing water discharging means[, such as a discharging pump,] for discharging [pan] *part* of *the* washing water containing food debris to [the] outside of the [system] *dishwasher*;

flowing path [opening/closing] *opening and closing* means disposed at a washing water discharging path [for] *to* selectively [opening/closing] *open and close* said washing water discharging path *based upon a pressure in the washing water discharging path and* in cooperation with *one of* said washing water circulation means [or] *and* said washing water discharging means; and food debris gathering and storing means disposed between the washing water circulation means and said washing water discharging path for filtering washing water filtered by the filtering apparatus and for gathering and storing the food debris contained in the washing water.

2. The apparatus of claim 1, wherein said [washing water] flowing [opening/closing] *path opening and closing* means [is] *comprises* an [opening/closing] *opening and closing* valve engaged to [the] *an* entrance of a discharging tube of the washing water discharging means, said [opening/closing] *opening and closing* valve being movable upwardly and downwardly.

3. The apparatus of claim 2, wherein said discharging tube includes an engaging section formed at [the] *an* inner surface thereof for [opening/closing] *opening and closing* the discharging tube by preventing the [opening/closing] *opening and closing* valve from moving upwardly in a horizontal state.

4. The apparatus of claim 1, wherein said food debris gathering and storing means includes an assistant filter engaged to an axis of said spray arm for filtering washing water, a washing water induction tube for connecting said assistant filter and the washing water circulation means, and a food debris induction tube for connecting the assistant filter and [the] *a* discharging tube and for storing the filtered food debris.

5. The apparatus of claim 4, wherein said assistant filter *comprises* a food debris gathering box, said food [water] *debris* gathering *box* being cylindrical and hollow so that the axis of the spray arm can pass therethrough, and a [fourth] filter formed with a net having a plurality of net eyes [having a certain size] *sized to be* capable of filtering [a relatively] small [size] food debris.

6. The apparatus of claim 5, wherein said washing water induction tube and said food debris induction tube [include a] *connected to* connection [tube] *tubes* disposed at [lower both sides] *a bottom* of the food debris gathering box [for connecting the washing water induction tube and the food debris induction tube].

7. The apparatus of claim 5, wherein said spray arm includes a plurality of lower surface [spry] *spray* openings [so as to come off] *configured to remove* food debris clogged [at] *in* the [fourth] *assistant* filter [in cooperation with] *by spraying* washing water [sprayed therefrom].

8. [The apparatus of claim 1,] *A food debris filtering apparatus for a dishwasher, comprising:*

*a filtering apparatus for filtering washing water polluted during a dish washing operation;*

*washing water circulation means for supplying the washing water filtered by said filtering apparatus to a spray arm;*

*washing water discharging means for discharging part of the washing water containing food debris to outside of the dishwasher;*

*flowing path opening and closing means disposed at a washing water discharging path for selectively opening and closing said washing water discharging path in cooperation with one of said washing water circulation means and said washing water discharging means; and*

*food debris gathering and storing means disposed between the washing water circulation means and said washing water discharging path for filtering washing water filtered by the filtering apparatus and for gathering and storing the food debris contained in the washing water,* wherein said spray arm includes a plurality of lower surface [spry] *spray* openings [so as to come off] *configured to remove* food debris clogged [at] *in* the [fourth filter in cooperation with] *food debris gathering and storing means by spraying* washing water [sprayed therefrom].

9. The apparatus of claim 1, wherein said food debris gathering and storing means includes food debris reverse flowing *prevention* means for preventing food debris from reversely flowing toward [the] *said* washing water circulation means in a discharging mode.

10. The apparatus of claim 9, wherein said food debris reverse *flowing* prevention means is an [opening/closing] *opening and closing* valve disposed at [the] *an* upper end of a washing water induction-side connection tube of [the] *a* food debris gathering box of the food debris gathering and storing means, said food debris reverse flowing prevention means being movable upwardly and downwardly.

11. A food debris filtering method for a dishwasher, comprising the steps of:

a discharging path blocking step which stops a driving of washing water discharging means in a dish washing mode and blocks a washing water discharging path in cooperation with *a* washing water circulation means;

a washing water circulation and refiltering step which sprays a part of washing water filtered by a filtering apparatus in cooperation with a driving of [said] *the* washing water circulation means and supplies [the] *a* remaining part thereof to an assistant filter;

a food debris gathering and storing step which gathers food debris filtered by the assistant filter and stores the [thusly] filtered food debris in a [certain] box;

a washing water discharging flowing path opening step which stops a driving of the washing water circulation means and opens a washing water flowing path by driving the washing water discharging means in a discharging mode; and a food debris discharging step which discharges food debris to [the] outside of the [system] *dishwasher* together with washing water in cooperation with a driving of the washing water discharging means.

12. The method of claim 11, wherein [said] *the* food debris gathering and storing step [is directed to] *includes* downwardly spraying washing water from [the] *a* lower surface of [the] *a* spray arm, so that food debris particles clogged [at] *in* the assistant filter [come off therefrom] *are removed* by *a* pressure of the washing water.

*13. The apparatus of claim 8, wherein the flowing path opening and closing means open and close said washing water discharging path based upon a pressure in the washing water discharging path.*

*14. A food debris filtering apparatus for a dishwasher, comprising:*

*a filtering apparatus that filters washing water polluted during a dish washing operation;*

*a washing water circulator that supplies the filtered washing water to a spray arm;*

*a washing water discharger that discharges part of the washing water containing food debris to outside of the dishwasher;*

*a flowing path opener and closer disposed at a washing water discharging path that selectively opens and closes said washing water discharging path in cooperation with one of said washing water circulator and said washing water discharger; and*

*a food debris gathering unit disposed between the washing water circulator and said washing water discharging path that filters washing water filtered by the filtering apparatus and that gathers and stores the food debris contained in the washing water, a top side of said food debris gathering unit comprising a filter.*

*15. The apparatus of claim 14, wherein said filter filters small food debris.*

*16. The apparatus of claim 15, wherein said spray arm includes a plurality of lower surface spray openings configured to remove food debris clogged in the filter by spraying washing water.*

*17. A food debris filtering apparatus for a dishwasher, comprising:*

*a filtering apparatus that filters washing water polluted during a dish washing operation;*

*a washing water circulator that supplies the filtered washing water to a spray arm;*

*a washing water discharger that discharges part of the washing water containing food debris to outside of the dishwasher;*

*a flowing path opener and closer disposed at a washing water discharging path that selectively opens and closes said washing water discharging path in cooperation with one of said washing water circulator and said washing water discharger; and*

*a food debris gathering unit disposed between the washing water circulator and said washing water discharging path that filters washing water filtered by the filtering apparatus and that gathers and stores the food debris contained in the washing water, wherein a bottom surface of said food debris gathering unit is connected to a plurality of tubes.*

*18. The apparatus of claim 17, wherein said food debris gathering unit includes a filter engaged to an axis of said spray arm for filtering washing water, a washing water induction tube for connecting said filter and said washing water circulator, and a food debris induction tube for connecting said filter and a discharging tube.*

* * * * *